United States Patent [19]

Abrams et al.

[11] 4,119,930
[45] Oct. 10, 1978

[54] COUPLING MODULATION IN TRAVELLING WAVE RESONATOR

[75] Inventors: Richard L. Abrams, Pacific Palisades; David M. Henderson, Playa Del Rey, both of Calif.

[73] Assignee: Hughes Aircraft Company, Culver City, Calif.

[21] Appl. No.: 726,337

[22] Filed: Sep. 24, 1976

[51] Int. Cl.$^2$ ............................................. G02F 1/22
[52] U.S. Cl. ............................. 332/7.51; 356/106 LR; 250/199
[58] Field of Search ............. 332/7.51; 356/106 LR; 250/199; 350/150; 331/94.5 M

[56] References Cited

U.S. PATENT DOCUMENTS

| | | | |
|---|---|---|---|
| 3,550,039 | 12/1970 | Herriott | 332/7.51 |
| 3,617,129 | 11/1971 | Skolnick | 356/106 LR |
| 3,625,590 | 12/1971 | Habegger | 350/106 LR |
| 3,841,758 | 10/1974 | Gievers | 356/106 LR |
| 3,885,874 | 5/1975 | Haas et al. | 356/106 LR |
| 3,994,566 | 11/1976 | Lotspeich et al. | 350/160 R |
| 4,053,763 | 10/1977 | Harney | 332/7.51 |

OTHER PUBLICATIONS

Henderson et al., "Multi-Gigahertz Modulation Concepts for CO$_2$ Laser Communications," 9/26/76, pp. 150–151, EASCON 176 record, IEEE.

Primary Examiner—Nelson Moskowitz
Attorney, Agent, or Firm—Don O. Dennison; W. H. MacAllister

[57] ABSTRACT

A wideband optical ring modulator is disclosed. A ring resonator containing a synchronous travelling wave electro-optic modulator is disposed external to a laser cavity. The invention provides a compact lightweight optical modulator which combines the power enhancement capabilities of a resonant cavity with the wideband capabilities of a travelling wave coupling modulator. The present invention is especially useful for, although not limited to, ultra-wideband infrared laser communication systems utilizing PCM techniques.

10 Claims, 6 Drawing Figures

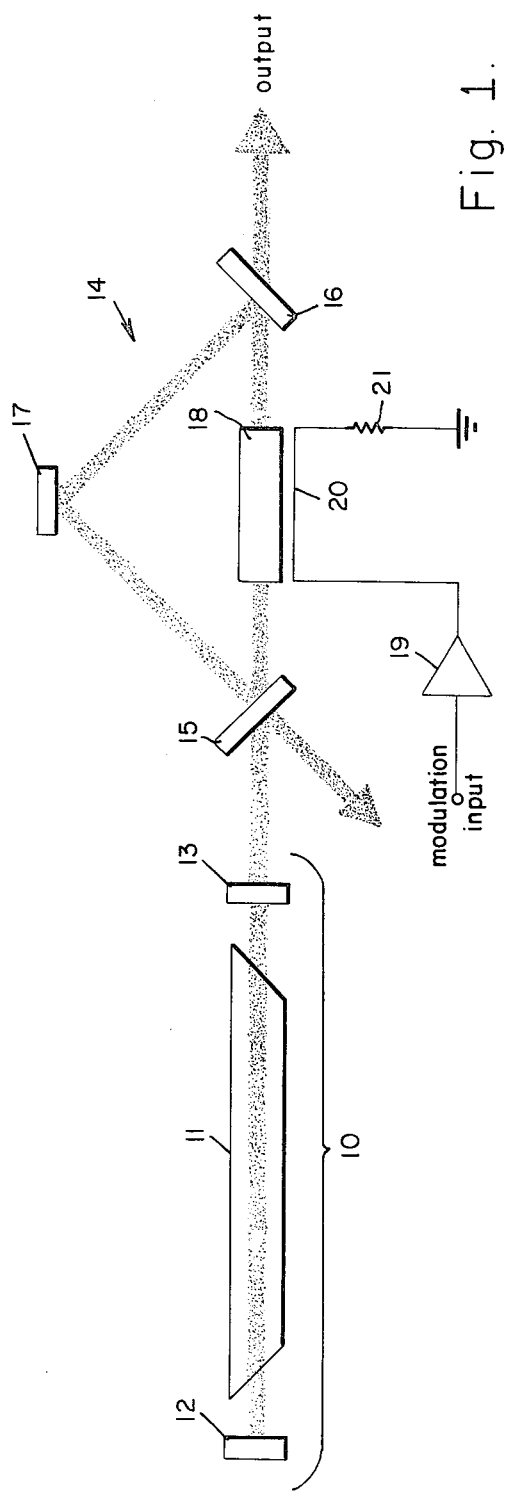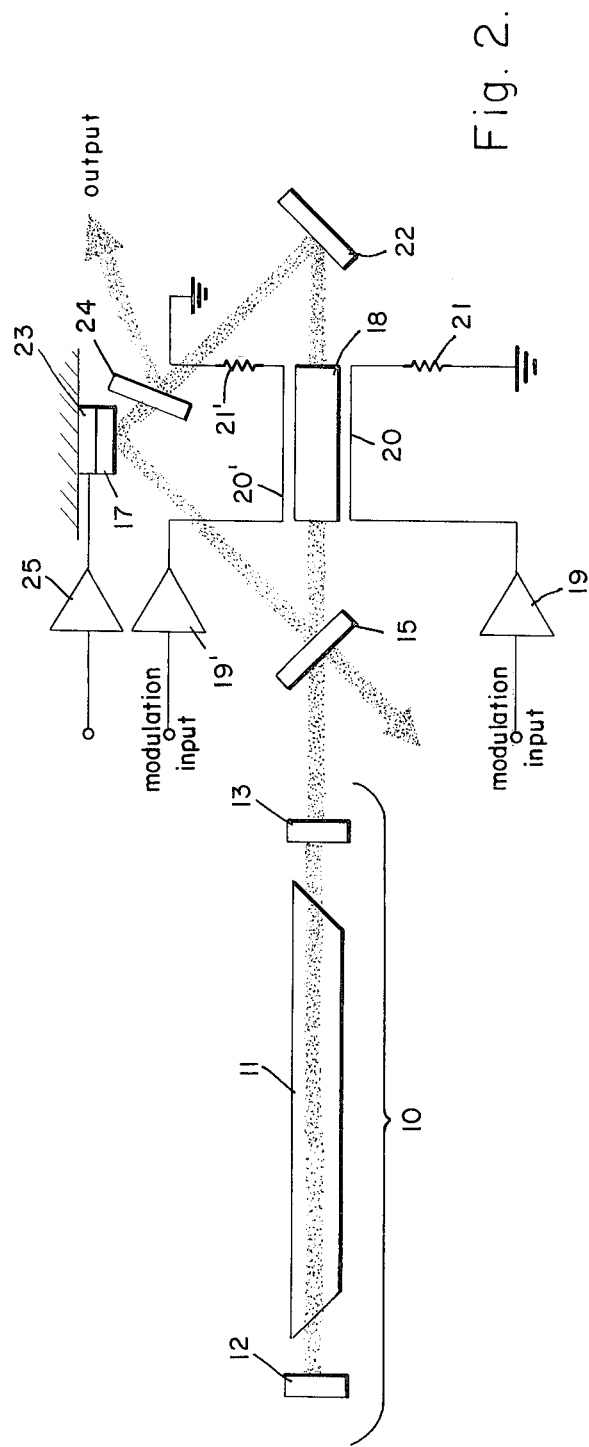

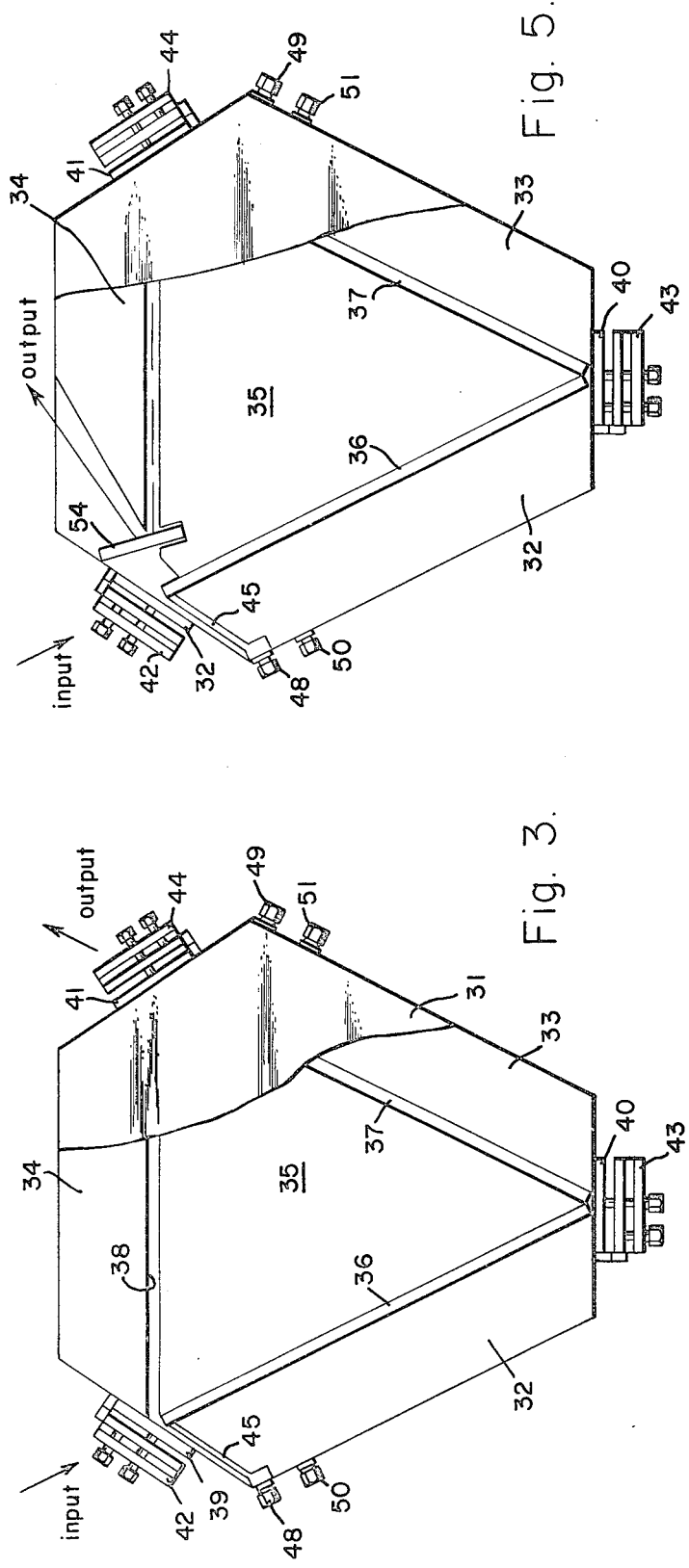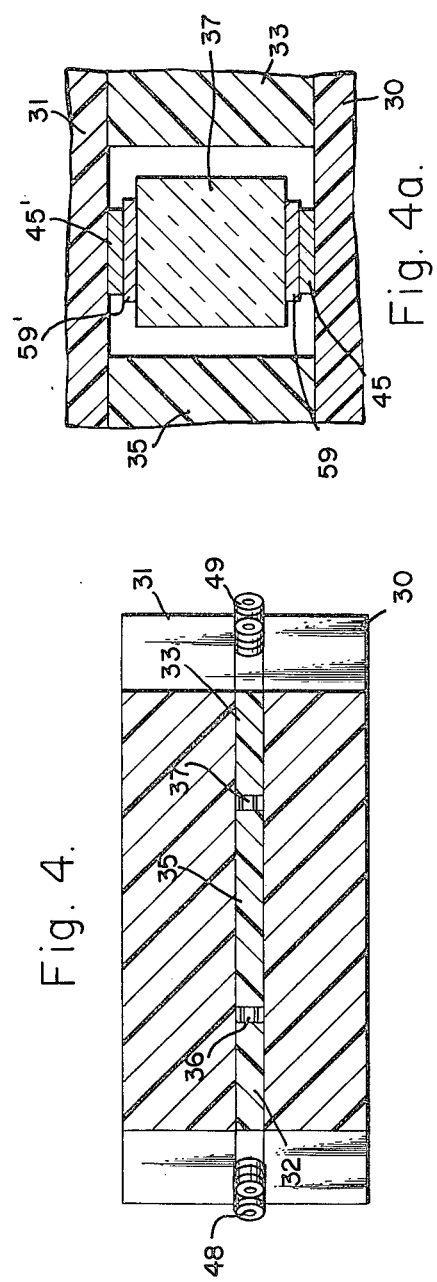

COUPLING MODULATION IN TRAVELLING WAVE RESONATOR

FIELD OF THE INVENTION

This invention relates to optical modulation techniques and, more specifically, to methods and apparatus for achieving ultra-wideband modulation in an infrared laser transmitter.

DESCRIPTION OF THE PRIOR ART

A great amount of research and development effort has been expended in recent years to develop electro-optic modulators which are capable of meeting the extended bandwidth requirements of advanced laser communication and data processing systems. Such effort has not only been directed to increasing the bandwidth of such modulators, but doing so while minimizing the required drive power, weight, size and expense.

Because of the well-known transit-time effect in electro-optic modulator devices efforts have turned to improvements in synchronous travelling wave type electro-optic modulators. One technique which employs a travelling wave electro-optic modulator is the so-called "thin-film" modulator in which a thin element of electro-optic crystal material is deposited or otherwise formed between a pair of strip transmission lines which support propagating optical wave energy. Although thin-film modulators of this type have the potential for operation over very wide bandwidths, it has been found that their optical power handling capabilities are limited. Increasing the thickness of the electro-optic crystal film to reduce the power density, in turn, requires higher modulator driving power until the point is reached where the advantages of the thin-film are substantially lost.

Another synchronous travelling wave electro-optic modulator is described in the copending application of R. L. Abrams and J. F. Lotspeich entitled, "Synchronous Travelling Wave Electro-Optic Light Pipe Modulator," Ser. No. 589,285, filed June 23, 1975, now U.S. Pat. No. 3,994,566. According to this invention, the electro-optic modulator is constructed utilizing larger bulk crystals of electro-optic material rather than thin-film. The usual limiting propagation length in bulk modulators caused by diffraction is avoided by propagating the optical signal in a waveguide mode in the modulator rod. By placing a number of these rods in tandem or cascade the required driver voltage can be made comparable to that of thin-film devices.

Although the above-mentioned copending application contemplates the placement of the travelling wave electro-optic light pipe modulator outside of the laser cavity, its low-loss characteristics make it attractive for intra-cavity coupling modulation as well. When utilized as an intra-cavity travelling wave modulator, the laser cavity takes the form of a resonant ring structure. In order to assure unidirectional optical propagation in such an intra-cavity structure, an optical isolator is required in one leg of the ring. The advantage of an intra-cavity modulator is that much greater power densities are achievable than is the case with a straightforward external travelling wave modulator of the type illustrated in the above-mentioned copending application. One drawback, however, of the ring resonator intra-cavity modulator structure is the above-mentioned requirement for an optical isolator. Although optical isolators suitable for such use are known in the art, they generally do not lend themselves to lightweight, low power, low cost systems.

Accordingly, it is an object of the present invention to provide a synchronous travelling wave electro-optic modulator having the power enhancement capabilities of a resonant ring structure without the disadvantages occasioned by the use of optical isolators.

It is another object of the present invention to achieve ultra-wideband optical modulation by means of a travelling wave electro-optic modulator disposed in a resonant ring cavity external to the laser cavity.

SUMMARY OF THE INVENTION

The above objects are achieved by utilizing a conventional laser oscillator and by coupling the output therefrom into a separate ring resonator which contains the modulator element or elements. The modulator elements themselves are preferably of the type disclosed in the above-mentioned copending application, Ser. No. 589,285. The invention, however, contemplates the use of other travelling wave electro-optic modulators such as the thin-film or bulk crystal types. The modulating signal is coupled to the electro-optic modulating element by means of an unbalanced, or preferably balanced, TEM transmission line so that the propagation velocity of the optical signal through the modulator element and the velocity of the rf modulating signal are substantially identical.

When this is done, and when the ring structure is maintained in resonance, there is an enhancement of the circulating power in the ring resonator cavity. Enhancement of the circulating power in the ring cavity on the order of ten times the incident power from the laser oscillator can be achieved with state-of-the-art components.

BRIEF DESCRIPTION OF THE DRAWINGS

In order that the invention may be clearly understood and readily carried into effect, it will now be described with reference by way of example to the accompanying drawings wherein like reference numerals refer to like elements and in which:

FIG. 1 is a simplified block diagram of a laser oscillator and modulator in accordance with the present invention;

FIG. 2 is a block diagram of another laser oscillator and modulator in accordance with the present invention;

FIG. 3 is a broken away plan view of a preferred embodiment of the present invention;

FIG. 4 is a cross-sectional elevation view of the embodiment of FIG. 3 taken through section lines 4—4;

FIG. 4a is a broken away cross-sectional view of an enlarged region of FIG. 4; and FIG. 5 is a broken away view of another embodiment of the present invention.

DESCRIPTION OF THE PREFERRED EMBODIMENTS

Referring more specifically to the drawings, there is shown in FIG. 1 a simplified block diagram of a laser oscillator and modulator in accordance with a preferred embodiment of the present invention. In FIG. 1, a laser oscillator 10 comprises a laser discharge tube 11 containing an active laser medium such as carbon dioxide and a pair of axially aligned reflecting end members or mirrors 12 and 13. As with such laser oscillators, mirror 12 is made totally reflecting and mirror 13 is made partially transmissive to facilitate coupling of optical wave energy from the laser oscillator. External to the laser oscillator cavity but optically coupled thereto is a modulator/ring resonator structure 14 comprising optically aligned partially transmissive mirror 15, polarizer 16, mirror 17 and electro-optic crystal 18. Mirrors 15 and 17 and polarizer 16 are arranged in a geometric ring configuration with respect to the optical wave energy, with electro-optic crystal 18 being disposed in the optical path between mirrors 15 and polarizer 16. Mirror 15 is partially transmissive to allow the optical wave energy to enter the modulator structure.

Although not shown in the simplified block diagram of FIG. 1 it is understood that suitable lenses can be employed to focus and direct the optical output of laser oscillator 10 into modulator/ring resonator 14. The modulating input signal is applied through modulator driver amplifier 19 through a strip transmission line section 20 which is electromagnetically coupled to electro-optic crystal 18. A matched impedance 21 is provided at the output end of transmission line 20 to present a reflectionless termination therefor. The modulated output is obtained through reflective polarizer 16. Again, suitable lenses, not shown, may be employed to recollimate the output wave energy.

In the simplified block diagram of FIG. 1, the means by which the optical path length of the ring resonator may be varied or stabilized is not shown. Such means can take the form of an electro-mechanical transducer such as a PZT crystal to which mirror 17 is attached. Such an arrangement is shown in FIG. 2, below. It is also possible to vary the length of the ring resonator by means of temperature or pressure sensitive means. In fact it can be advantageous to utilize temperature responsive means to provide longer term resonator stability and electro-mechanical means for short term stability.

In the description that follows, it may be assumed that the optical wavelength of the output of oscillator 10 is in the region of 10.6 microns. This corresponds, of course, to a preferred transition of the $CO_2$ laser which is commonly employed in modern optical communication systems. It is to be understood, however, that the choice of such an operating wavelength is merely exemplary and that other lasers operating on other wavelengths can be used with suitable modifications to the components of the embodiments to be described.

In any event, the optical wave energy generated by laser oscillator 10 is coupled through partially transmissive mirror 13 into the modulator/ring resonator structure by means of partially transmissive mirror 15. By virtue of the ring geometry provided by mirror 15, polarizer 16 and mirror 17, this optical wave energy propagates unidirectionally in a counterclockwise direction as shown in FIG. 1. As the circulating optical wave energy transits electro-optic crystal 18, its polarization is varied in accordance with the modulating potential coupled to the crystal by means of strip transmission line section 20. A more detailed description of the electro-optic crystal 18, transmission line section 20 and other structural details of the modulator will be given below in connection with the embodiments of FIGS. 3, 4 and 5. Presently, however, it is sufficient to note that electro-optic crystal 18 can conveniently comprise an elongated rod of cadmium telluride which is essentially transparent and electro-optically active in the region of 2–23 microns. The modulating signal is applied as a synchronous or substantially synchronous travelling wave to the crystal by virtue of the geometry and therefore impedance of strip transmission line section 20. The modulating rf, propagating in the preferred TEM mode, thereby acts upon the optical wave energy throughout the length of crystal 18.

As mentioned hereinabove, the ring resonator structure of modulator 14 provides a degree of power enhancement not to be found in conventional external travelling wave coupling modulators. This power enhancement may be calculated with the aid of FIG. 1.

It is assumed that part of the optical input wave energy is reflected from mirror 15, as indicated by the dashed arrow, even though most of it enters the ring resonator cavity. $R_m^2$ and $T_m^2$ represent the reflectivity and transmissivity of mirror 15, respectively. Since it is assumed that the other losses at this point are minimal, $R_m^2 + T_m^2 = 1$. Similarly, let $T_c^2$ represent the single pass transmissivity of the ring resonator cavity. All cavity losses $L_c$ are accounted for by the relation $L_c = 1 - T_c^2$. The incident, reflected and circulating powers are designated $P_i$, $P_r$ and $P_c$, respectively.

The power enhancement of the modulator of FIG. 1 may be found by summing the electric fields of the light components which have passed through the cavity repeated times. After $n$ transits, the electric field in the cavity is:

$$E_c^{(n)} = T_m E_i [1 + T_c R_m e^{i\phi} + (T_c R_m)^2 e^{i2\phi} + \ldots + (T_c R_m)^n e^{in\phi}] \quad [1]$$

where $\phi$ is the phase shift undergone by the optical wave energy during a single pass of the ring cavity.

As the number of transits $n$ becomes very large, Equation [1] becomes:

$$E_c = T_m E_i / (1 - T_c R_m e^{i\phi}) \quad [2]$$

The ratio of the circulating power to the incident power is:

$$\frac{P_c}{P_i} = \frac{(1 - R_m^2)}{1 - 2 T_c R_m \cos\phi + (T_c R_m)^2} \quad [3]$$

while the power absorbed in the ring cavity is:

$$P_a = (1 - T_c^2) P_c \quad [4]$$

In a similar manner the ratio of the reflected power to the incident power is found to be:

$$\frac{P_r}{P_i} = \frac{R_m^2 - 2 T_c R_m \cos\phi + T_c^2}{1 - 2 T_c R_m \cos\phi + (T_c R_m)^2} \quad [5]$$

By constraining the cavity dimensions so that $\cos \phi = 1$ the resonant condition is obtained. Under this condition it may be seen that considerable power enhancement is achieved for cavity losses of 10% or less. Furthermore, the cavity can be critically coupled by selecting the proper reflectivity of mirror 15. At critical coupling, the reflected component reduces to zero and all the incident power is absorbed in the cavity. Thus at critical coupling, $\phi$ is an integral multiple of $2\pi$ (i.e. $\cos \phi = 1$) and $$R_m = T_c \quad [6]$$

and $$P_c/P_i = 1/(1 - T_c^2) \qquad [7]$$

For a 10% single pass loss, Equation [6] shows an enhancement of 10 is achieved with a 90% reflecting mirror 15.

In FIG. 2 there is shown a simplified block diagram of another embodiment of the present invention. Where appropriate, like reference numerals have been carried over from FIG. 1 to designate like structural elements. Insofar as the laser oscillator portion of the embodiment is concerned, it is identical to the one shown in FIG. 1. The resonant travelling wave modulator, however, is characterized by differences which make it attractive in some applications.

In FIG. 2, polarizer 16 has been replaced by totally reflecting mirror 22. Output coupling is provided by means of a transmissive polarizer 24 disposed in the optical path between mirrors 22 and 17. A second strip transmission line section 20' together with its associated modulator driver amplifier 19' and matched load impedance 21' are also provided. To provide means for varying the optical path length of the ring resonator, mirror 17 is mounted to an electro-mechanical transducer 23. Transducer 23, which can for example, comprise PZT crystal is driven electronically through a driver amplifier 25.

The advantages of a balanced transmission line 20 and 20' are that less driver power is required for a given modulation index. This balanced strip line technique is described in greater detail in the above-mentioned co-pending application, Ser. No. 589,285 of Abrams and Lotspeich.

In operation, the output of laser oscillator 10 is coupled into the travelling wave modulator structure as before through partially transparent mirror 15. Again, because of the geometry of the ring resonator structure, only the optical wave propagating in the counterclockwise sense will result. The propagating optical wave energy is modulated by means of electro-optic crystal 18 driven by the push-pull modulation input supplied to modulator driver amplifiers 19 and 19'. The circulating modulated optical wave energy is extracted from the modulator/ring resonator structure by means of transmissive polarizer 24 which is oriented with its preferred or transmissive direction favoring the unmodulated optical wave energy.

In order to maintain the resonant length of the ring resonator in the presence of thermal and/or acoustic changes, mirror 17 is mounted to a rigid frame by means of piezoelectric transducer 23. Transducer 23 is, in turn, driven by driver amplifier 25 which may be coupled by appropriate feedback means, not shown, to auxiliary circuitry to insure the resonant condition. This may be conveniently accomplished by sensing the incident energy reflected from input mirror 15, since the reflected energy is minimum at the resonant condition of the ring cavity modulator.

The broken away view of FIG. 3 and cross-sectional view of FIG. 4 taken together depict a modified modulator structure similar to that illustrated in the block diagram of FIG. 2. FIG. 3 is a plan view of the modulator structure with the top body portion partially broken away. FIG. 4 is a cross-sectional plan view of the complete body, both top and bottom, taken through the section lines 4—4 shown in the drawing of FIG. 3.

Slab-like lower and upper body portions 30 and 31 are maintained in spaced-apart relationship by rod retainers and channel defining spacers 32, 33 and 34. These latter elements together with triangularly shaped member 35 define three narrow triangularly disposed grooves, two of which are substantially occupied by elongated electro-optic crystal rods 36 and 37. The third groove 38 serves in the embodiment of FIG. 3 as an optical channel and is not occupied by a rod of electro-optic material. The three triangularly disposed grooves terminate at their respective apexes in partially transmissive mirror 39, totally reflecting mirror 40 and reflective polarizer 41. Mirrors 39, 40 and polarizer 41 are mounted in adjustable mounting structures 42, 43 and 44, the respective details of which are not shown. In the case of mirror mount 43, the structure can also include the electro-mechanical transducer used to tune and maintain the ring modulator at resonance.

The lower strip transmission line 45 is shown in FIG. 3 as extending from an output coaxial connector 48. This strip transmission line extends under electro-optic crystal rod 36 along its length and thence along the length of electro-optic crystal rod 37 and exits the modulator structure by means of coaxial connector 49. The upper strip transmission line sections are disposed in a similar manner on the upper body housing 31 and are not shown in FIG. 3. Coaxial connectors 50 and 51, however, are shown. The impedance of the microstrip transmission line is selected such that the velocity of the TEM modulating wave is substantially the same as the optical wave velocity through the rods.

In practice it has been found desirable to deposit conductive films on the upper and lower surfaces of rods 36 and 37 as well as on the contiguous regions of blocks 30 and 31. Such an arrangement is shown in the enlarged cross-sectional view of FIG. 4a. FIG. 4a depicts electro-optic crystal rod 37 and the surrounding detail. Rod 37 is provided with conductive films 59 and 59' on its bottom and top surfaces, respectively. A second pair of somewhat narrower conductive films 45 and 45' are deposited on the surfaces of blocks 30 and 31 adjacent films 59 and 59'. When the complete modulator structure is assembled and suitably secured the combination of films 45–59 and 45'–59' provide continuous ohmic contact along the crystal lengths.

In an experimental embodiment operating at 10.6 microns, the length of the rod was 5 centimeters. The rod was of substantially square cross section 1.5 millimeters on a side. With cadmium telluride as the rod material and beryllium oxide as the material of the supporting blocks the impedance for synchronous travelling wave operation was computed as approximately 100 ohms or in case of the dual stripline configuration, 50 ohms.

In FIG. 5, there is shown a cross-sectional plan view of a modulator similar to that depicted in FIG. 2 wherein the output coupling means comprises a transmissive polarizer 54. A slot is provided in triangular element 35 to accommodate the polarizer and a portion of spacer 34 has been cut out to facilitate transmission of the output beam. In other respects the remaining structural elements of the embodiment of FIG. 5 are substantially identical to those shown in FIGS. 3, 4 and 4a.

In all cases, it is understood that the abovedescribed embodiments are merely illustrative of but a few of the many specific embodiments which can represent applications of the principles of the present invention. For example, although ring resonator structures of triangular configuration have been illustrated, it is apparent that other ring geometries are possible. Numerous and varied other arrangements can be readily devised in accordance with these principles by those skilled in the art without departing from the spirit and scope of the invention.

What is claimed is:

1. A wideband optical ring modulator comprising, in combination, a ring resonator supportive of unidirectionally propagating optical energy, a travelling wave electro-optic modulator disposed within said ring resonator, first means for coupling unmodulated optical energy into said ring resonator from an external source and second means for coupling modulated optical energy from said ring resonator to the exclusion of unmodulated optical energy.

2. A wideband optical modulator comprising, in combination:

a plurality of geometrically arranged reflecting members, said reflecting members defining a ring resonator for optical energy, a first of said reflecting members being transmissive to optical energy incident thereon from an optical source external to said ring resonator;

at least one element of electro-optic material disposed within said ring resonator;

means for coupling a modulating signal to said element of electro-optic material;

said element of electro-optic material being capable of modulating the optical energy within said ring resonator in response to said modulating signal; and means for coupling modulated optical energy from said ring resonator to the exclusion of unmodulated optical energy.

3. The optical modulator according to claim 2 including means for varying the resonant length of said ring resonator.

4. The optical modulator according to claim 2 wherein said element of electro-optic material comprises an elongated rod of cadmium telluride.

5. The optical modulator according to claim 2 wherein a second of said reflecting members comprises a reflective polarizer.

6. The optical modulator according to claim 2 wherein said means for coupling optical energy from said ring resonator comprises a transmissive polarizer disposed between two of said reflecting members.

7. A wideband optical modulator comprising, in combination:

a plurality of geometrically arranged reflecting members, said reflecting members defining a ring resonator supportive of unidirectionally propagating optical energy, a first of said reflecting members being transmissive to optical energy incident thereon from an optical source external to said ring resonator;

at least one element of electro-optic material disposed within said ring resonator;

at least one strip transmission line for coupling an rf modulating signal to said element of electro-optic material in substantial synchronism with the optical energy propagating therein;

said element of electro-optic material being capable of modulating the optical energy within said ring resonator in response to said modulating signal; and means for coupling modulated optical energy from said ring resonator to the exclusion of unmodulated optical energy.

8. The optical modulator according to claim 7 wherein said means for coupling optical energy from said ring resonator comprises a transmissive polarizer disposed between two of said reflecting members.

9. In combination:

a laser oscillator having a pair of end reflecting members defining a resonant laser cavity and a laser medium disposed within said laser cavity, one of said end reflecting members providing an output for optical energy generated by said laser oscillator;

a ring resonator supportive of unidirectionally propagating optical energy;

a travelling wave electro-optic modulator disposed within said ring resonator;

means for coupling the output of said laser oscillator into said ring resonator; and means for coupling modulated optical energy from said ring resonator to the exclusion of unmodulated optical energy.

10. The combination according to claim 9 wherein said travelling wave electro-optic modulator comprises at least one elongated rod of cadmium telluride and at least one strip transmission line electromagnetically coupled thereto.

* * * * *